US011685451B2

(12) United States Patent
Tokach et al.

(10) Patent No.: US 11,685,451 B2
(45) Date of Patent: Jun. 27, 2023

(54) SHIELD FOR DRIVE MOTOR

(71) Applicant: Clark Equipment Company, West Fargo, ND (US)

(72) Inventors: Thomas J. Tokach, Mandan, ND (US); Daniel J. Krieger, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 414 days.

(21) Appl. No.: 16/295,689

(22) Filed: Mar. 7, 2019

(65) Prior Publication Data

US 2019/0276100 A1 Sep. 12, 2019

Related U.S. Application Data

(60) Provisional application No. 62/639,682, filed on Mar. 7, 2018.

(51) Int. Cl.
*B62D 55/088* (2006.01)
*B62D 55/06* (2006.01)
*B62D 55/125* (2006.01)
*B62D 55/24* (2006.01)

(52) U.S. Cl.
CPC ........... *B62D 55/088* (2013.01); *B62D 55/06* (2013.01); *B62D 55/125* (2013.01); *B62D 55/244* (2013.01)

(58) Field of Classification Search
CPC .. B62D 55/06; B62D 55/088; B62D 55/0887; B62D 55/12; B62D 55/125; B62D 55/13; B62D 25/165; F16J 15/54
USPC .......................................... 180/9.62; 305/107
See application file for complete search history.

(56) References Cited

U.S. PATENT DOCUMENTS

| 1,812,543 | A | 6/1931 | White |
| 3,861,762 | A | 1/1975 | Freedy et al. |
| 3,912,336 | A | 10/1975 | Ritter, Jr. et al. |
| 3,913,985 | A | 10/1975 | Orr et al. |
| 4,084,653 | A | 4/1978 | Boen |
| 6,231,136 | B1 | 5/2001 | Freeman |
| 6,293,631 | B1 * | 9/2001 | Freeman ................ B62D 25/16 |
| | | | 301/107 |
| 6,371,578 | B1 | 4/2002 | Ferguson |
| 7,156,474 | B2 | 1/2007 | Safe et al. |
| 7,946,661 | B1 | 5/2011 | Freeman |
| 8,356,680 | B2 | 1/2013 | Jackson |
| 8,632,137 | B2 | 1/2014 | Auch et al. |
| 9,446,804 | B2 | 9/2016 | Haven et al. |

(Continued)

FOREIGN PATENT DOCUMENTS

| JP | 2013189042 A | 9/2013 |
| JP | 2017052312 A | 3/2017 |
| WO | 2016066589 A1 | 5/2016 |

OTHER PUBLICATIONS

International Search Report and Written Opinion dated Jun. 5, 2019 for International Application No. PCT/US2019/021158 file Mar. 7, 2019, 14 pages.

*Primary Examiner* — Anne Marie M Boehler
(74) *Attorney, Agent, or Firm* — John Veldhuis-Kroeze; Westman, Champlin & Koehler, P.A.

(57) ABSTRACT

Tracked vehicles and drive systems for tracked vehicles including a guard or shield for a drive motor that deflects debris drawn into a space where the drive motor is located. The guard also provides a longer critical path between the outside of a drive motor assembly and an inside of the drive motor assembly.

8 Claims, 7 Drawing Sheets

(56) References Cited

U.S. PATENT DOCUMENTS

| | | |
|---|---|---|
| 2002/0140287 A1 | 10/2002 | Fee et al. |
| 2009/0085303 A1 | 4/2009 | Kometani et al. |
| 2011/0148188 A1* | 6/2011 | Larson .................. B62D 55/12 |
| | | 305/107 |
| 2016/0075385 A1 | 3/2016 | Haven et al. |
| 2017/0247069 A1 | 8/2017 | Iijima et al. |
| 2021/0061378 A1* | 3/2021 | Freeman .............. B62D 55/125 |

\* cited by examiner

SHIELD FOR DRIVE MOTOR

CROSS-REFERENCE TO RELATED APPLICATION

This application claims the benefit of U.S. Provisional Application No. 62/639,682, which was filed on Mar. 7, 2018.

BACKGROUND

This disclosure is directed toward power machines. More particularly, this disclosure is directed toward track drive systems for power machines. Power machines, for the purposes of this disclosure, include any type of machine that generates power to accomplish a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Track loaders are useful in a variety of applications and are often preferred over wheel loaders. For example, in muddy or soft conditions, track loaders are often preferred because they distribute the weight of the loader more evenly and are thus less destructive to fragile surfaces and a wheeled skid steer loader.

The discussion above is merely provided for general background information and is not intended to be used as an aid in determining the scope of the claimed subject matter.

SUMMARY

This disclosure is directed toward tracked vehicles and drive systems for tracked vehicles. Embodiments disclosed herein illustrate a guard for a drive motor on a tracked vehicle that deflects debris drawn into a space where the drive motor is located and provides a longer critical path between the outside of a drive motor assembly and an inside of the drive motor assembly.

In an exemplary disclosed embodiment, a guard (380) for a drive motor assembly (350) of a tracked power machine (100, 200, 300) is provided. The drive motor assembly is carried by a track frame (340) of the power machine to drive a track (344), and the drive motor assembly has a first portion (362) fixedly attached to the track frame and a second portion (364) coupled to a sprocket (352) and the first portion. The sprocket is configured to rotate relative to the first portion. The guard (380) includes a first end (388) configured to be attached to the first portion of the drive motor assembly and positioned adjacent a surface (374) of the first portion to provide a sealing surface against the first portion of the drive motor assembly. A second end of the guard has a vertical wall (384) configured to be positioned proximal to the second portion of the drive motor assembly when the guard is secured to the first portion. A gap is formed between the vertical wall and the second portion of the drive motor assembly to allow the second portion to move relative to the vertical wall. The vertical wall and the horizontal surface are configured to urge material away from a critical path (370) formed by a parting line between the first and second portions of the drive motor assembly and a portion extending from the vertical wall and extending over the second portion.

In some exemplary embodiments, the guard further comprises a surface (382) adjacent the vertical wall (384) and extending generally laterally therefrom such that when the guard is mounted to the drive motor assembly the surface (382) is positioned between the track and the drive motor assembly. In some embodiments, the vertical wall (384) and the surface (382) extending generally laterally therefrom are configured to urge material away from the critical path (370) formed by the parting line between the first and second portions of the drive motor assembly to reduce the likelihood of material being introduced into the drive motor assembly.

In some exemplary embodiments, the guard has a generally semi-circular shape to fit along a contour of a top surface of the motor assembly.

In another exemplary embodiment, a power machine (100, 200, 300) is provided, comprising a machine frame (110, 210, 211, 310, 311) and a track assembly (320) coupled to the machine frame. The track assembly includes a track frame (340). A track (344) is supported by the track frame and configured to be driven around the track frame. A drive motor assembly (350) is carried by the track frame and has a first portion (362) fixedly attached to the track frame and a second portion (364) coupled to and configured to rotate relative to the first portion. A sprocket (352) is coupled to the second portion of the drive motor assembly and is configured to rotate with the second portion. The sprocket includes a plurality of sprocket teeth (354) configured to engage the track. A shield (380) is attached to the first portion (362) of the drive motor assembly and includes a first surface (388) that is positioned against a surface (374) of the first portion of the drive motor assembly to provide a sealing surface against the first portion. The shield also includes a second surface (382) configured to be positioned beneath the track when the shield is secured to the first portion of the drive motor assembly. A vertical wall (384) of the shield is adjacent the second surface (382) and is configured to be positioned proximal to the second portion of the drive motor assembly when the shield is secured to the first portion. A gap is formed between the vertical wall and the second portion of the drive motor assembly to allow the second portion to move relative to the vertical wall. The vertical wall and the second surface are configured to urge material away from a critical path (370) formed by a parting line between the first and second portions of the drive motor assembly and a portion extending from the vertical wall and extending over the second portion.

In some exemplary embodiments of the power machine, the track has at least two rows of protruding teeth (356) configured to prevent lateral movement of the track as the track moves relative to the track frame, and the second surface (382) extends generally laterally from the vertical wall (384) such that the second surface is positioned between the protruding teeth of the track and the drive motor assembly.

In some exemplary embodiments, the second surface (382) and the vertical wall (384) of the shield are configured to urge the material away from the critical path (370) to reduce the likelihood of the material being introduced into the drive motor assembly.

In some exemplary embodiments, the shield has a generally semi-circular shape to fit along a contour of a top surface of the drive motor assembly.

In some exemplary embodiments, the shield further includes mounting features (386) configured to secure the shield to the first portion of the drive motor assembly.

This Summary and the Abstract are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter.

DETAILED DESCRIPTION

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for description and should not be regarded as limiting. Words such as "including," "comprising," and "having" and variations thereof as used herein are meant to encompass the items listed thereafter, equivalents thereof, as well as additional items.

Figure 2:
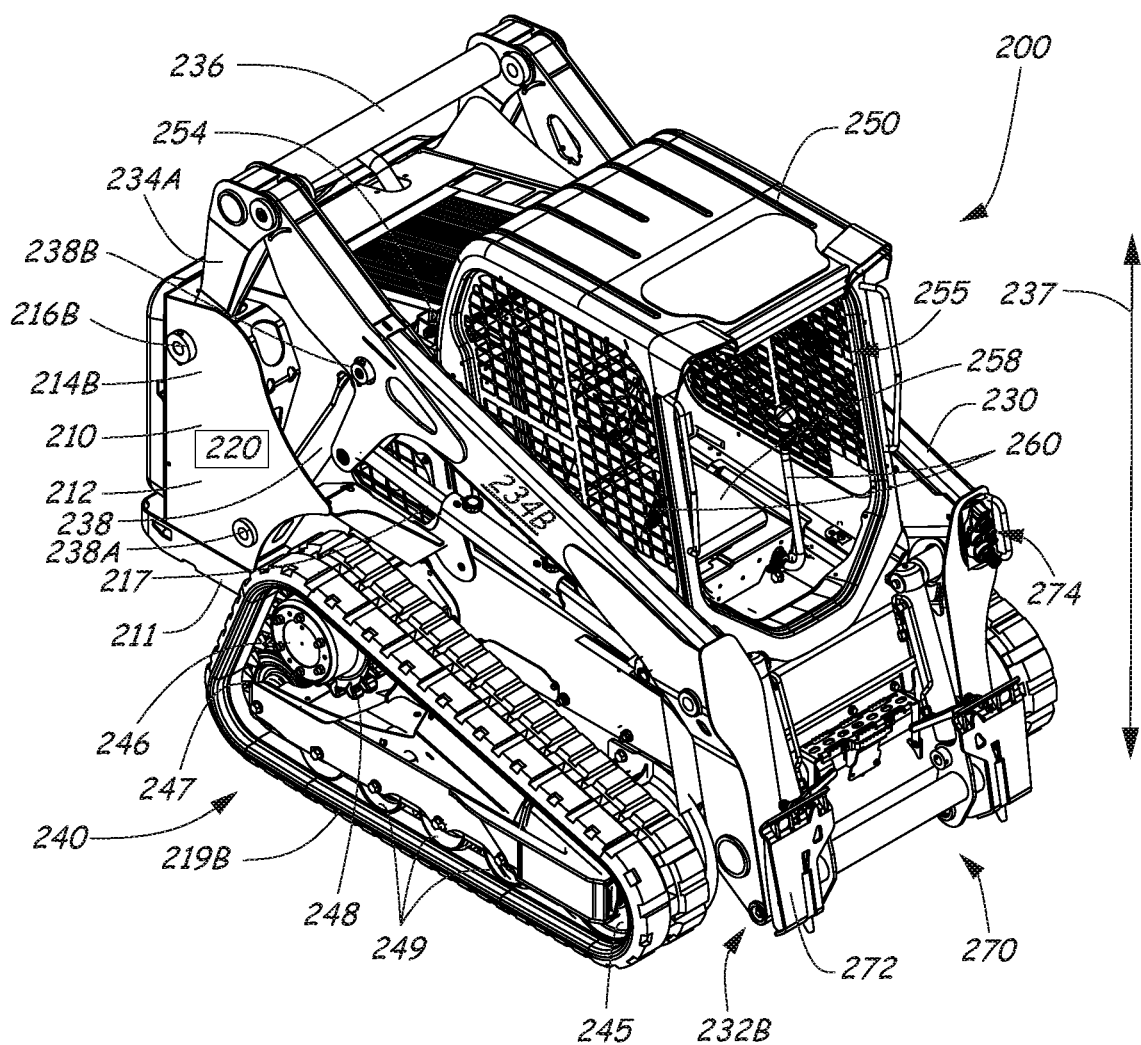
FIG. 2 is a perspective view showing generally a front of a power machine in the form of a compact track loader on which embodiments disclosed in this specification can be advantageously practiced.
Figure 3:
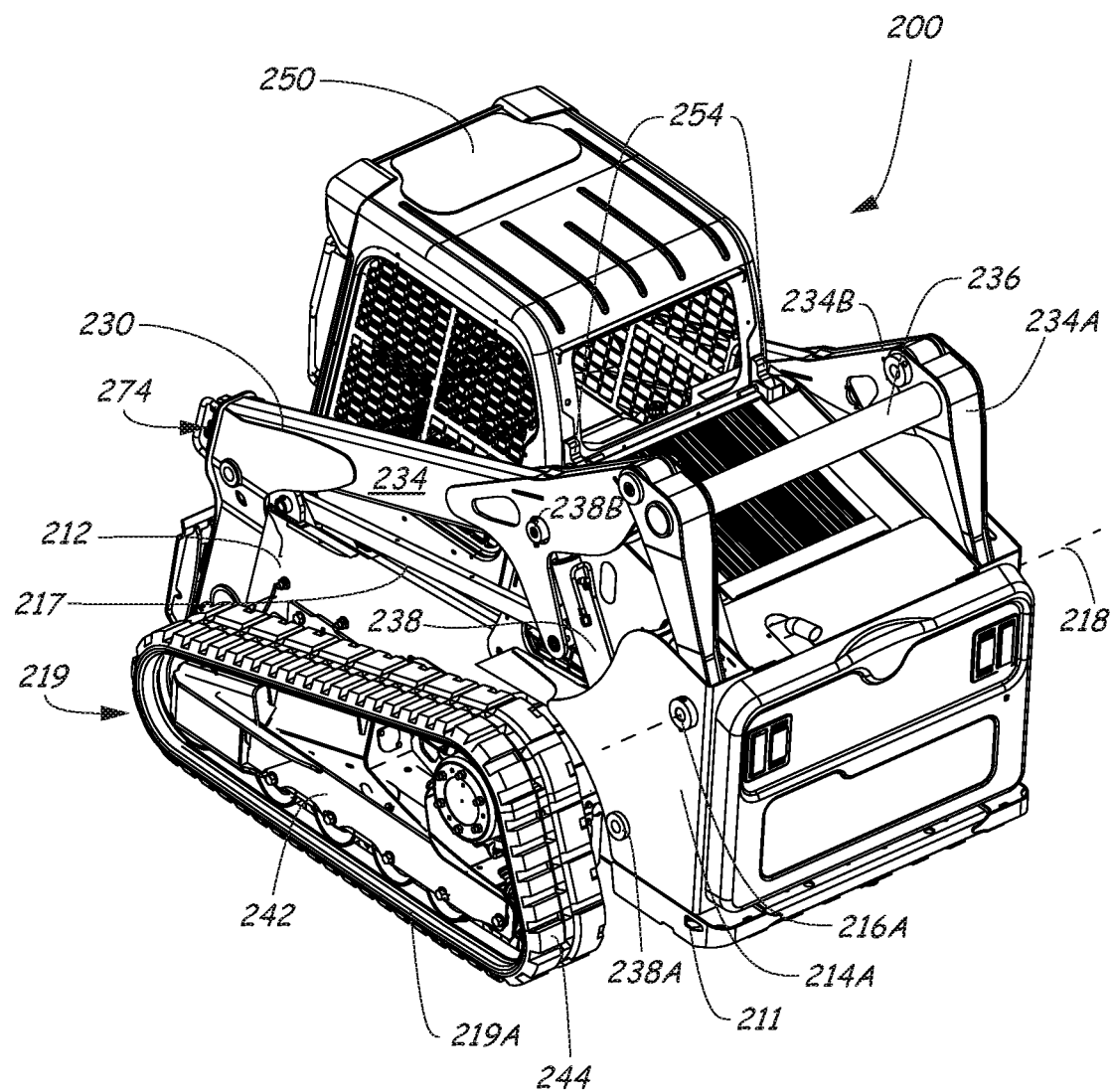
FIG. 3 is a perspective view showing generally a back of the power machine shown in FIG. 2.

Drive motors on tracked machines that have hydrostatic drive systems are susceptible to intrusion by mud and other debris. When foreign material enters the housing of the drive motor, components in the drive motor can be damaged or destroyed. Embodiments below disclose a guard to protect drive motors from suffering damage due to the intrusion of foreign materials. These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
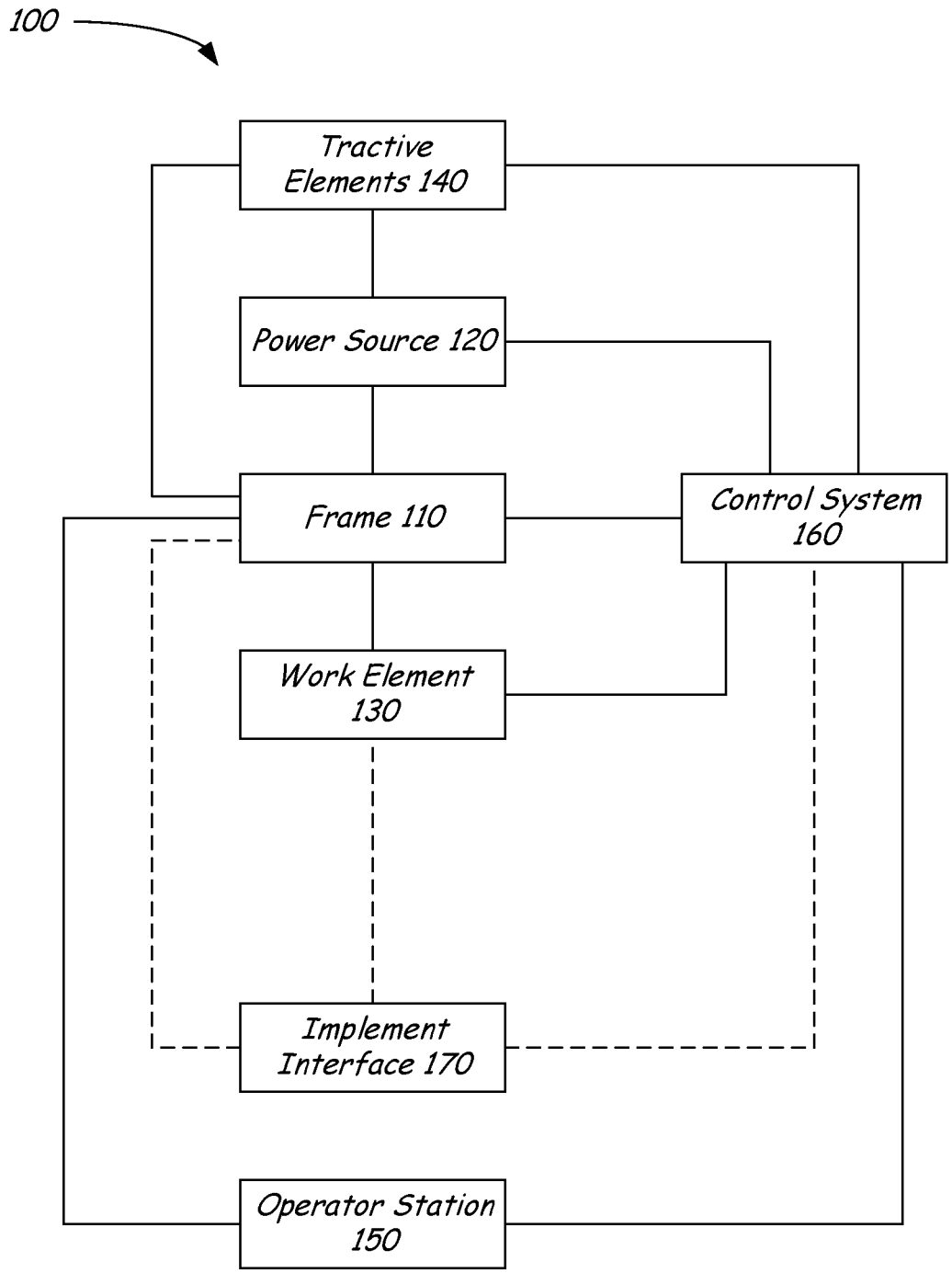
FIG. 1 is a block diagram illustrating functional systems of a representative power machine on which embodiments of the present disclosure can be advantageously practiced.

FIG. 1 illustrates a block diagram illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. In some instances, the implement can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, the implement carrier is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which can provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator-controlled functions on the power machine.

FIGS. 2-3 illustrates a loader 200, which is one particular example of a power machine of the type illustrated in FIG. 1 where the embodiments discussed below can be advantageously employed. Loader 200 is a track loader and more particularly, a compact tracked loader. A track loader is a loader that has endless tracks as tractive elements (as opposed to wheels). Track loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the track loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220 that can generate or otherwise provide power for operating various functions on the power machine. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270 that includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices to cause the power machine to perform various work functions. Cab 250 can be pivoted back about an axis that extends through mounts 254 to provide access to power system components as needed for maintenance and repair.

The operator station 255 includes an operator seat 258 and the various operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that are capable of including and/or interacting with the embodiments discussed below can have various different frame components that support various work elements. The elements of frame 210 discussed herein are provided for illustrative purposes and should not be considered to be the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214A and 214B (collectively 214) located on either side and toward the rear of the mainframe (only one is shown in FIG. 2) that support a lift arm assembly 230 and to which the lift arm assembly 230 is pivotally attached. The lift arm assembly 230 is illustratively pinned to each of the upright portions 214. The combination of mounting features on the upright portions 214 and the lift arm assembly 230 and mounting hardware (including pins used to pin the lift arm structure to the mainframe 212) are collectively referred to as joints 216 (one is located on each of the upright portions 214) for the purposes of this discussion. Joints 216 are aligned along an axis 218 so that the lift arm structure is capable of pivoting, as discussed below, with respect to the frame 210 about axis 218. Other power machines may not include upright portions on either side of the frame or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 219A and 219B on either side of the loader 200 (only one is shown in FIG. 2), which on loader 200 are track assemblies.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An exemplary implement interface 270 is provided at a second end 234B of the arm 234. The implement interface 270 includes an implement carrier 272 that is capable of accepting and securing a variety of different implements to the lift arm 230. Such implements have a machine interface that is configured to be engaged with the implement carrier 272. The implement carrier 272 is pivotally mounted to the second end 234B of the arm 234. Implement carrier actuators 233 are operably coupled the lift arm assembly 230 and the implement carrier 272 and are operable to rotate the implement carrier with respect to the lift arm structure.

The implement interface 270 also includes an implement power source 235 available for connection to an implement on the lift arm assembly 230. The implement power source 235 includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The electrical power source 235 also exemplarily includes electrical conduits that are in communication with a data bus on the excavator 200 to allow communication between a controller on an implement and electronic devices on the loader 200. It should be noted that the specific implement power source on loader 200 does not include an electrical power source.

The lower frame 211 supports and has attached to it a pair of tractive elements 219, identified in FIGS. 2-3 as left track assembly 219A and right track assembly 219B. Each of the tractive elements 219 has a track frame 244 that is operably coupled to the lower frame 211. The track frame 242 supports and is surrounded by an endless track 244, which rotates under power to propel the loader 200 over a support surface. Various elements are coupled to or otherwise supported by the track frame 242 for engaging and supporting the endless track 244 and cause it to rotate about the track frame. For example, a drive motor 246 having a sprocket 248 mounted thereto is supported by the track frame 242. The drive motor 246 powers the sprocket 248 to rotate and the sprocket engages the endless track 244 to cause the endless track to rotate about the track frame. A pair of idlers 245 and 247 engage the track 244 to maintain proper tension on the track. Idler 245 is held against the track 244 by a tensioner (not shown). The track frame 242 also supports a plurality of rollers 249, which engage the track and, through the track, the support surface to support and distribute the weight of the loader 200.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 4:
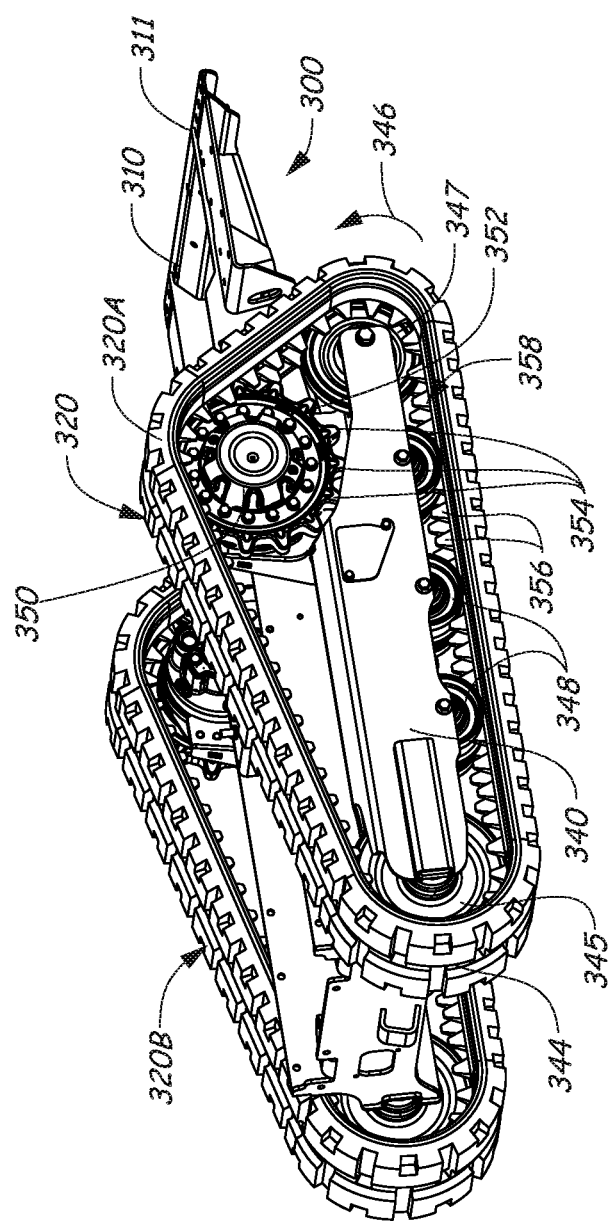
FIG. 4 is a perspective view of a portion of a frame of a track loader having a drive motor mounted thereto according to one illustrative embodiment.

FIG. 4 illustrates a portion of a compact track loader 300. Only a portion of the loader 300 is shown, but loader 300 in some embodiments is similar to the loader 200. Compact track loader 300 has a frame 310, including a lower frame portion 311. Other embodiments may not have a separate lower frame portion and whether or not a particular loader has a lower frame portion is not essential to any of the embodiments. Loader 300 has a pair of track assemblies 320, identified as 320A and 320B in FIG. 4. The features of the track assemblies 320 are described with reference to the track assembly 320A. The same features can be incorporated into either or both of track assemblies 320A and 320B. To that end, track assembly 320A will be referenced as track assembly 320 from this point forward.

Track assembly 320 includes a track frame 340 that is operably coupled to loader frame 310. Track frame 340, in various embodiments, can be rigidly mounted to loader frame 310, mounted via a suspension mounting system or in other ways. Track frame 340 carries a drive motor assembly 350 including a sprocket 352 with a plurality of teeth 354 that are configured to engage features in track 344 to drive the track around the track frame 340. In some embodiments, including the track 344 shown in FIG. 4, the features in track 340 with which the teeth engage are apertures formed through the track. Track 344 is a rubber track, in other embodiments, the track can be formed of different materials. The track 344 is also engaged by front and rear idlers 345 and 347, respectively, to maintain a desired tension on the track. In addition, rollers 348 also engage track 344.

Track 344 has two rows of protruding teeth 356, which extend along an interior surface 358 of track 344. The rows of teeth 356 advantageously act to prevent lateral movement of the track 344 as the track moves about the track frame 340. The two rows are spaced apart so that the sprocket 352 and the front and rear idlers 345 and 347 are carried between the rows. These teeth act to discourage lateral movement of the track and more specifically act to discourage detracking of the track.

While the teeth 356 do discourage detracking, they can introduce material into the area near the motor assembly 350 and provide an action that tends to push material into the motor housing and potentially damaging the motor assembly. For example, if the loader is being driven in muddy conditions, mud can be carried up toward the motor assembly 350, especially when the track is moved to drive the loader forward, as indicated by arrow 346. When the motor is driven forward, the track 344 moves in a direction shown by arrow 346. Mud and other material can be carried up toward the motor assembly 350. In some embodiments, a track may not have teeth such as the teeth 356. Regardless, the area between the track and the motor assembly 350 can be susceptible to having mud and other material being carried into that space, even if the track doesn't have such teeth. The presence of teeth 356 does exacerbate the problem, however.

Figure 5:
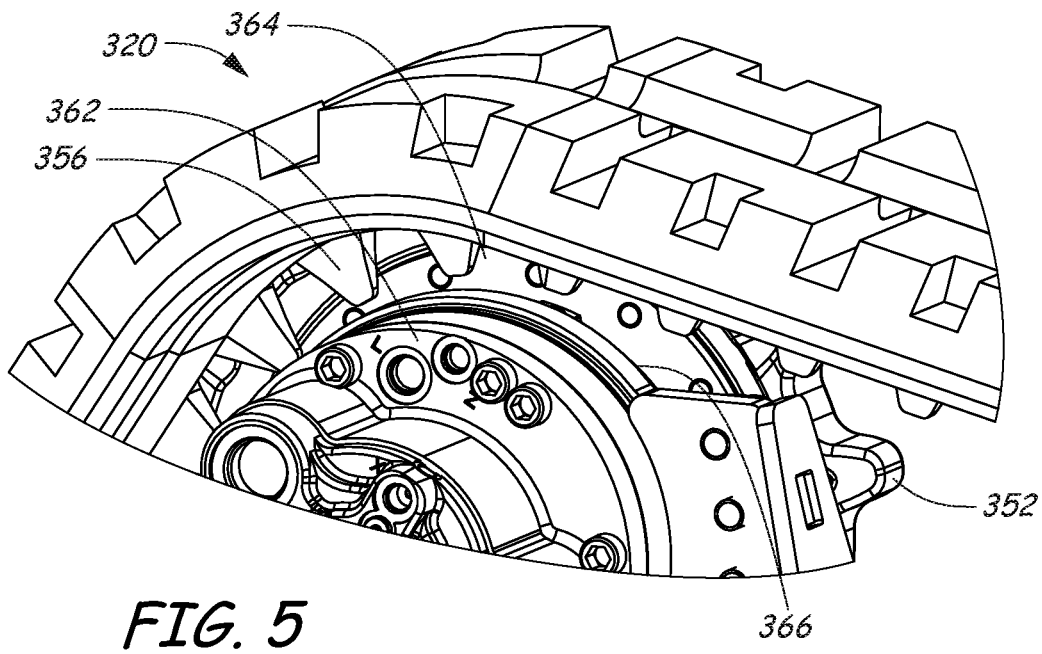
FIG. 5 is a perspective view showing an opposite side of the drive motor illustrated in FIG. 4.
Figure 6:
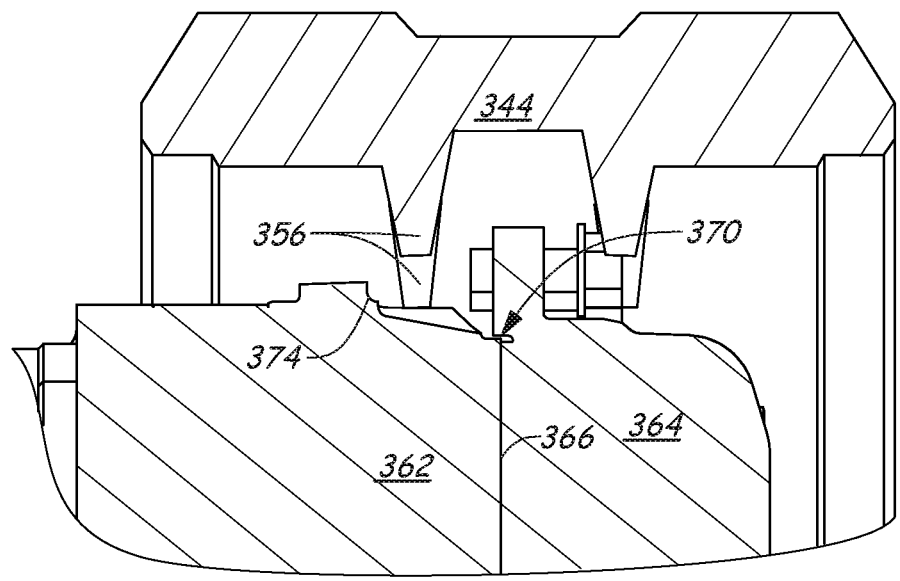
FIG. 6 illustrates a cross-section of the drive motor and track of the track loader of FIG. 4, illustrating a critical path through which debris can enter the interior of the drive motor.

FIG. 5 illustrates a view of the motor assembly 350 from an opposing side of the track assembly 320. The drive motor assembly 350 includes a first portion 362 that is fixedly attached to the track frame 340 and a second portion 364 that is rotatable with respect to the first portion under power. The sprocket 352 is rigidly coupled to the second portion 364 and rotates with the second portion. A parting line 366 is the division between the first and second portions 362 and 364. As the teeth 356 move around the motor assembly 350, they can carry mud and other material into the area proximal to the parting line 366 and tends to drive material between the two portions and into the housing, which damages the drive motor. FIG. 6 shows a cross section of the track 344 and the drive motor assembly 350. The teeth 356 tend to push material toward the parting line 366 and along a critical path 370 and into the drive motor assembly 350.

Figure 7:
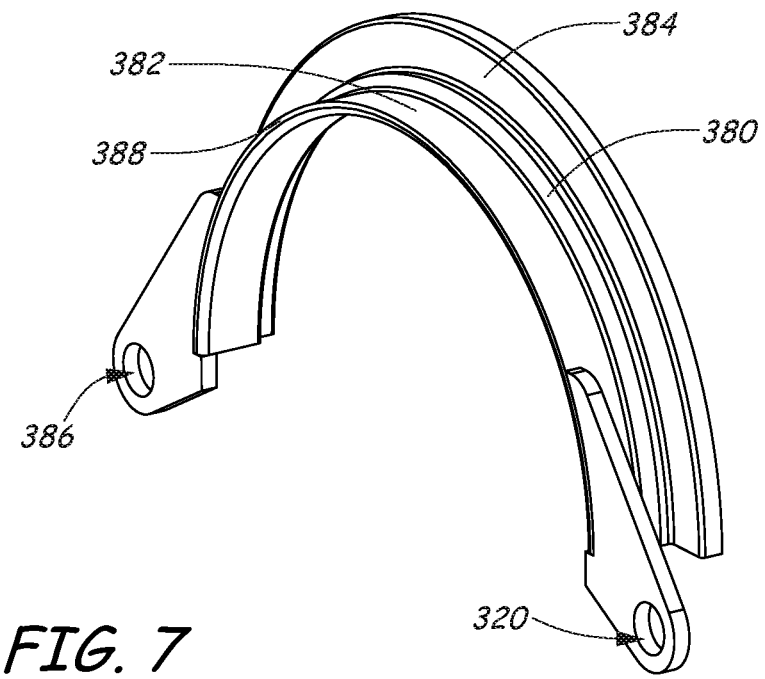
FIG. 7 illustrates a guard for a drive motor according to one illustrative embodiment.
Figure 8:
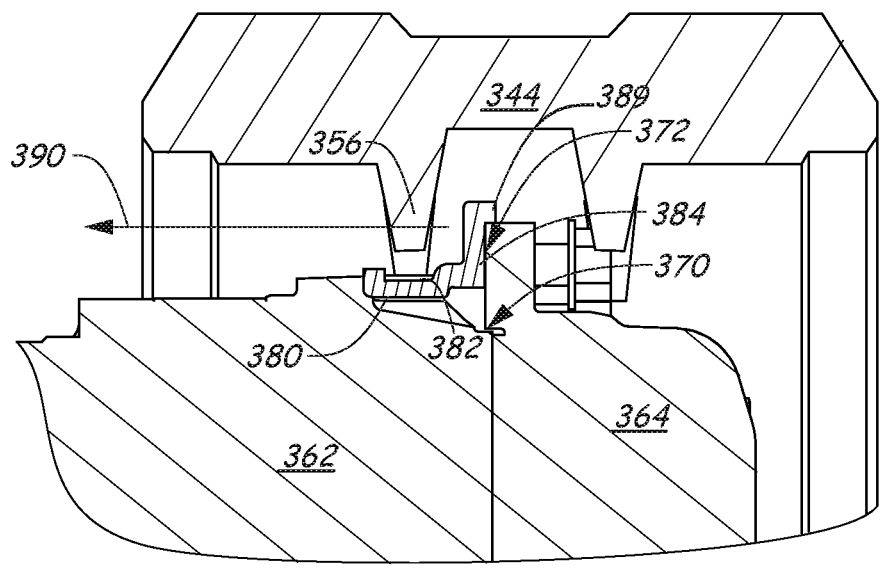
FIG. 8 is a cross-sectional illustration of the drive motor as shown in FIG. 6 with the guard from FIG. 7 installed.
Figure 9:
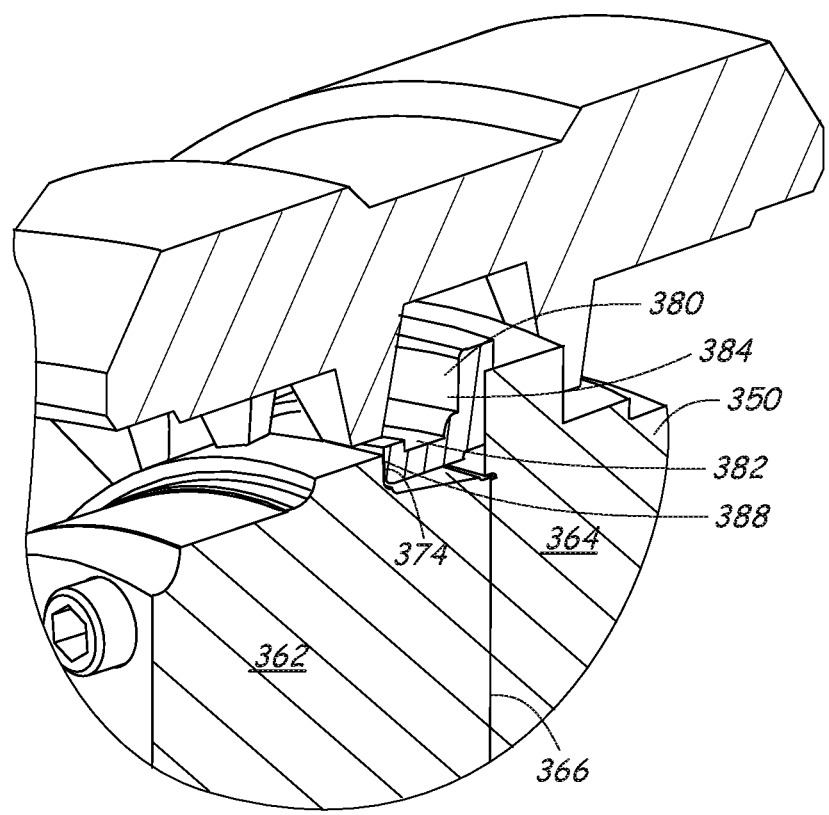
FIG. 9 is a perspective view of the cross-sectional illustration of FIG. 8.

FIG. 7 illustrates a guard 380 for attachment to the drive motor assembly 350 according to one illustrative embodiment. The guard 380, in this embodiment, is semi-circular in shape to conform generally with the shape of a portion of the drive motor assembly and intended to be attached to the first portion of the drive motor assembly 350 above and outside of where the first portion and the second portion meet, as can be seen in FIGS. 8-9. The guard 380 is semi-circular in shape because the area that needs most protection is the area above the drive motor assembly and beneath the track. The bottom side of the drive motor assembly is not nearly as susceptible to intrusion by mud and other material, so the guard 380 does not extend over that portion of the drive motor assembly. This configuration of a semi-circular guard also provides the ability to easily add the guard to existing machines without substantial disassembly of the track assembly. The guard 380 has a horizontal surface 382 that is intended to extend be positioned underneath the teeth 356 of track 344. A vertical wall 384 is positioned proximal to the second portion 364 of the drive motor assembly 350. Because the second portion 364 of the drive motor assembly 350 moves relative to the first portion 362 of the drive motor assembly, at least a small gap must exist between the wall 384 and the second portion 364 to allow the second portion to move. Mounting features 386 are provided to secure the guard 380 to the first portion 362 of the drive motor assembly. As mentioned above, FIGS. 8-9 show the guard 380 in position. When the guard 380 is in position, surface 388 on the guard 380 is held against surface 374 of the first portion 362 of the drive motor assembly 350, providing a metal to metal sealing surface, which will tend to prevent mud or other foreign material from entering a space under the guard 380.

The vertical wall 384 and the horizontal surface 382 tend to urge material away from the critical path 370 and in a direction shown by arrow 390. This urging of material in the preferred direction reduces the amount of material that might otherwise be pushed toward the critical path 370. In addition, the vertical wall 384 extends the critical path to include not only the path 370 but also the path 372, which is the small gap between the vertical wall 384 and the second portion 364 of the drive motor assembly 350. The vertical wall 384 and a second surface, horizontal surface 382 in this exemplary embodiment, are configured to urge material away from the critical path 370 formed by the parting line 366 between the first and second portions of the drive motor assembly and a portion extending from the vertical wall and extending over the second portion because the vertical wall 384 extends higher than surface 388 so that material is urged away from the drive motor in the direction of arrow 390. In addition, a tang portion 389 of the guard 380 extends beyond the vertical wall 384 to direct the critical path into a direction that is opposing the direction shown by arrow 390. Thus, the critical path is extended and the likelihood of material entering the drive motor housing is reduced.

The embodiments herein provide some important advantages. By placing a guard over drive motor in the area where track aligning teeth would otherwise tend to carry mud and other debris and pack mud in this area, material is directed away from a critical path into the drive motor space and the critical path into the drive motor is lengthened and directed away from where material tends to gather to further inhibit the intrusion of material into the drive motor.

Although the present invention has been described with reference to preferred embodiments, workers skilled in the art will recognize that changes may be made in form and detail to the disclosed embodiments without departing from the spirit and scope of the concepts discussed herein.

What is claimed is:

1. A power machine, comprising:
   a machine frame;
   a track assembly coupled to the machine frame, the track assembly comprising:
      a track frame;
      a track supported by the track frame and configured to be driven around the track frame, the track having protruding teeth;
      a drive motor assembly carried by the track frame, the drive motor assembly having a first portion fixedly attached to the track frame and a second portion coupled to and configured to rotate relative to the first portion;
      a sprocket coupled to the second portion of the drive motor assembly and configured to rotate with the second portion, the sprocket having a plurality of sprocket teeth configured to engage the track;
   a one-piece shield attached to the first portion of the drive motor assembly, the one-piece shield comprising:
      a first surface that is positioned against a surface of the first portion of the drive motor assembly to provide a sealing surface against the first portion;
      a second surface configured to be positioned beneath the track when the shield is secured to the first portion of the drive motor assembly; and
      a vertical wall adjacent the second surface and configured to be positioned proximal to the second portion of the drive motor assembly when the shield is secured to the first portion, the second surface extending from the vertical wall such that the second surface is positioned between the protruding teeth of the track and the drive motor assembly, a gap being formed between the vertical wall and the second portion of the drive motor assembly to allow the second portion to move relative to the vertical wall, the vertical wall and the second surface configured to urge material away from a critical path formed by a parting line between the first and second portions of the drive motor assembly.

2. The power machine of claim 1, wherein the track has at least two rows of protruding teeth configured to prevent lateral movement of the track as the track moves relative to the track frame.

3. The power machine of claim 1, wherein the second surface of the one-piece shield extends generally laterally from the vertical wall.

4. The power machine of claim 3, wherein the second surface and the vertical wall of the one-piece shield are configured to urge the material away from the critical path to reduce the likelihood of the material being introduced into the drive motor assembly.

5. The power machine of claim 1, wherein the one-piece shield has a generally semi-circular shape to fit along a contour of a top surface of the drive motor assembly.

6. The power machine of claim 1, and further comprising mounting features configured to secure the one-piece shield to the first portion of the drive motor assembly.

7. The power machine of claim 1, wherein a tang part of the one-piece shield extends from the vertical wall of the one-piece shield over the second portion of the drive motor assembly.

8. A power machine, comprising:
a machine frame;
a track assembly coupled to the machine frame, the track assembly comprising:
  a track frame;
  a track supported by the track frame and configured to be driven around the track frame, wherein the track has at least two rows of protruding teeth configured to prevent lateral movement of the track as the track moves relative to the track frame;
  a drive motor assembly carried by the track frame, the drive motor assembly having a first portion fixedly attached to the track frame and a second portion coupled to and configured to rotate relative to the first portion;
  a sprocket coupled to the second portion of the drive motor assembly and configured to rotate with the second portion, the sprocket having a plurality of sprocket teeth configured to engage the track;
a shield attached to the first portion of the drive motor assembly, the shield comprising:
  a first surface that is positioned against a surface of the first portion of the drive motor assembly to provide a sealing surface against the first portion;
  a second surface configured to be positioned beneath the track when the shield is secured to the first portion of the drive motor assembly; and
  a vertical wall adjacent the second surface and configured to be positioned proximal to the second portion of the drive motor assembly when the shield is secured to the first portion, a gap being formed between the vertical wall and the second portion of the drive motor assembly to allow the second portion to move relative to the vertical wall, the vertical wall and the second surface configured to urge material away from a critical path formed by a parting line between the first and second portions of the drive motor assembly, and wherein the second surface extends generally laterally from the vertical wall such that the second surface is positioned between the protruding teeth of the track and the drive motor assembly.

* * * * *